United States Patent [19]

Terashima

[11] Patent Number: 5,205,383

[45] Date of Patent: Apr. 27, 1993

[54] REACTION FORCE TYPE DISK BRAKE

[75] Inventor: Hideyuki Terashima, Nagano, Japan

[73] Assignee: Nissin Kocyo Co., Ltd., Ueda, Japan

[21] Appl. No.: 788,696

[22] Filed: Nov. 6, 1991

[30] Foreign Application Priority Data

Dec. 11, 1990 [JP]  Japan ................................ 2-400348

[51] Int. Cl.[5] ............................................. F16D 65/20
[52] U.S. Cl. .................................. 188/73.45; 188/71.1
[58] Field of Search ..................... 188/73.45, 73.1, 71.1

[56] References Cited

U.S. PATENT DOCUMENTS

| | | | |
|---|---|---|---|
| 4,002,226 | 1/1977 | Rainbolt et al. | 188/73.43 |
| 4,068,745 | 1/1978 | Haraikawa | 188/73.3 |
| 4,261,444 | 4/1981 | Caplygin | 188/73.45 |
| 4,424,886 | 1/1984 | Frigger et al. | 188/73.45 |
| 4,614,254 | 9/1986 | Mery et al. | 188/71.1 |
| 4,773,511 | 9/1988 | Giering et al. | 188/73.1 |
| 4,784,243 | 11/1988 | Mery | 188/73.45 |
| 4,865,161 | 9/1989 | Schneider et al. | 188/73.45 |
| 4,993,519 | 2/1991 | Thioux | 188/73.45 |

FOREIGN PATENT DOCUMENTS

| | | |
|---|---|---|
| 0035928 | 9/1981 | European Pat. Off. . |
| 57-23432 | 2/1982 | Japan . |
| 57-149629 | 9/1982 | Japan . |
| 59-740 | 1/1984 | Japan . |
| 1181085 | 11/1967 | United Kingdom . |
| 1563213 | 3/1980 | United Kingdom . |
| 2159221 | 11/1985 | United Kingdom . |
| 2176258 | 12/1986 | United Kingdom . |
| 2243887 | 11/1991 | United Kingdom . |

Primary Examiner—Robert J. Oberleitner
Assistant Examiner—Kevin D. Rutherford
Attorney, Agent, or Firm—Armstrong, Westerman, Hattori, McLeland & Naughton

[57] ABSTRACT

Since slide-pin support portions and first braking-torque support portions are independent of each other in the body of a bracket included in a reaction force type disk brake, even if the first braking-torque support portions have deflected more or less by supporting the braking torque of a first friction pad, the deflections are not transmitted to the slide-pin support portions. Accordingly, no twists take place between slide pins and the slide-pin support portions. Besides, in the bracket, the support points of the respective slide pins are arranged in a region defined between second and third straight lines, so that even when the braking torque of a second friction pad has acted on the slide-pin support points through second braking-torque support portions as well as the slide pins on account of the shortened distances between the slide-pin support points and bracket fixation points, turning moments which arise about the fixation points are small. Accordingly, a brake caliper is permitted to slide smoothly, and the durability of the bracket for supporting the brake caliper can be enhanced.

3 Claims, 11 Drawing Sheets vehicle front

REACTION FORCE TYPE DISK BRAKE

BACKGROUND OF THE INVENTION

1. Field of the Invention

The field of the present invention is reaction force type disk brakes, of a type which is mainly used for vehicles such as automobiles, and more particularly, improvements in a reaction force type disk brake comprising a first and a second friction pad facing opposite faces of a brake disk, respectively; a brake caliper provided with a first and a second clamping arm for clamping both the friction pads; opposite ends of the brake caliper in a circumferential direction of the brake disk being supported by a pair of slide-pin support portions of a fixed bracket through slide pins outside an outer periphery of the brake disk for sliding movements in a direction of a rotational axis of the brake disk; an urging member provided on the first clamping arm and having a center of urging at a central position of the first friction pad in the circumferential direction of the brake disk for urging the first friction pad to the brake disk; a pair of first braking-torque support portions mounted on the bracket for supporting a braking torque of the first friction pad; and a pair of second braking-torque support portions mounted on the brake caliper for supporting a brake torque of the second friction pad; wherein a pair at which fixing points of the bracket is fixed to a stationary member located at opposite sides of a first straight line which passes the center of urging and a center of rotation of the brake disk, the fixing points being disposed on a second straight line which crosses the first straight line at a location closer to the center of rotation with respect to the center of urging.

2. Description of the Prior Art

Heretofore, the disk brake of the type described above, is already known from, e.g., Japanese Patent Application Laid-open No. 22660/1977.

In such a disk brake, a single block protruded from the body of the bracket is commonly used by the first braking-torque support portions for supporting the braking torque of the first friction pad and the slide-pin support portions for supporting the slide pin.

In addition, the slide-pin support points, at which the slide pins are supported are arranged closer to the outer periphery of the brake disk than to a third straight line which is parallel to the second straight line and which passes the urging center.

In the above disk brake, when braking, since the braking torque effecting on the first friction pad is supported by the first braking-torque support portions, the first braking-torque support portions deflect in some degree If the single block is commonly used as in the conventional disk brake under such circumstances, the deflection of the first braking-torque support portions are directly transmitted to the slide-pin support portion. And as a result, a twist may arise between the slide pin and the slide-pin support portion, thereby deteriorating the smooth slide movement of the brake caliper which is undesirable.

Moreover, if the slide-pin support point is arranged as described above, a distance between the slide-pin support point and the fixing point becomes long. Therefore, when the braking torque effecting on the second friction pad has acted on the slide-pin support point through the second braking-torque support portion as well as the slide pin, a turning moment of relatively large magnitude is generated about the fixing point. This is undesirable for improving the durability of the bracket.

SUMMARY OF THE INVENTION

In view of the above, the object of the present invention is to provide a reaction force type disk brake in which the deflection of the braking-torque support portion is prevented from being transmitted to a slide-pin support portion and in which a turning moment about the fixing point can be made small.

To achieve the above object, according to the present invention, there is provided a reaction force type disk brake comprising a first and a second friction pad facing opposite faces of a brake disk, respectively; a brake caliper provided with a first and a second clamping arm for clamping both the friction pads; opposite ends of the brake caliper in a circumferential direction of the brake disk being supported by a pair of slide-pin support portions of a fixed bracket through slide pins outside an outer periphery of the brake disk for sliding movements in a direction of a rotational axis of the brake disk; an urging member provided on the first clamping arm and having a center of urging at a central position of the first friction pad in the circumferential direction of the brake disk for urging the first friction pad to the brake disk; a pair of first braking-torque support portions mounted on the bracket for supporting a braking torque of the first friction pad; and a pair of second braking-torque support portions mounted on the brake caliper for supporting a brake torque of the second friction pad; wherein a pair at which fixing points of the bracket is fixed to a stationary member are located on opposite sides of a first straight line which passes the center of urging and a center of rotation of the brake disk, the fixing points being disposed on a second straight line which crosses the first straight line at a position closer to the center of rotation with respect to the center of urging. and wherein the slide-pin support portions and the first braking-torque support portions are independently mounted on a body of the bracket, and slide-pin support points of both the slide-pin support portions are arranged in a region defined between the second straight line and a third straight line which passes through the center of urging in parallel with the second straight line.

According to this arrangement, since the first braking-torque support portion and the slide-pin support portion are independently provided in the body of the bracket, the deflection of the first braking-torque support portion is not transmitted to the slide-pin support portion. Thus, a twist between the slide pin and the slide-pin support portion due to a braking torque can be prevented from occurring, and the brake caliper is permitted to smoothly slide at all times.

Moreover, by disposing both the slide-pin support points are arranged in the specific region as described above, turning moments which arise about the respective fixing points during supporting the braking torque can be made small. Thus, the durability of the bracket can be improved.

The above and other objects, features and advantages of the present invention will become apparent from the following description of preferred embodiments taken with reference to the accompanying drawings.

BRIEF DESCRIPTION OF THE DRAWINGS

FIGS. 1 to 9 illustrate a first embodiment of the present invention, in which FIG. 1 is a plan view of a reaction force type disk brake, FIG. 2 is a view taken along an arrow 2 in FIG. 1, FIG. 3 is a view taken along an arrow 3 in FIG. 1, FIG. 4 is a sectional view taken along a line 4—4 in FIG. 2, FIG. 5 is a perspective view of a bracket, FIG. 6 is a sectional view taken along a line 6—6 in FIG. 2, FIG. 7 is a sectional view taken along a line 7—7 in FIG. 1, FIG. 8 is a sectional view taken along a line 8—8 in FIG. 2, and FIG. 9 is a perspective view showing the relationship between a vehicle body and the disk brake;

DESCRIPTION OF THE PREFERRED EMBODIMENTS

The first embodiment of the present invention will be described with reference to FIGS. 1 to 9.

The drawings illustrate a reaction force type disk brake D for an automobile. Referring to FIGS. 1 to 4, a brake disk 1 is rotatable with a wheel in a direction of an arrow a during forward travel of the automobile and in a direction of an arrow b during backward travel, respectively. First and second friction pads $3_1$, $3_2$ are disposed in an opposed relation to opposite side surfaces of the brake disk 1. These pads $3_1$, $3_2$ are clamped by first and second clamping arms $5_1$, $5_2$ of a brake caliper 4. Opposite ends of the brake caliper 4 located in a circumferential direction of the brake disk 1 are supported by a bracket 6 so as to slide along an axis of rotation c of the brake disk 1 at an outer periphery thereof. The bracket 6 is fixed to a knuckle 7 which is a stationary member.

Figure 5:
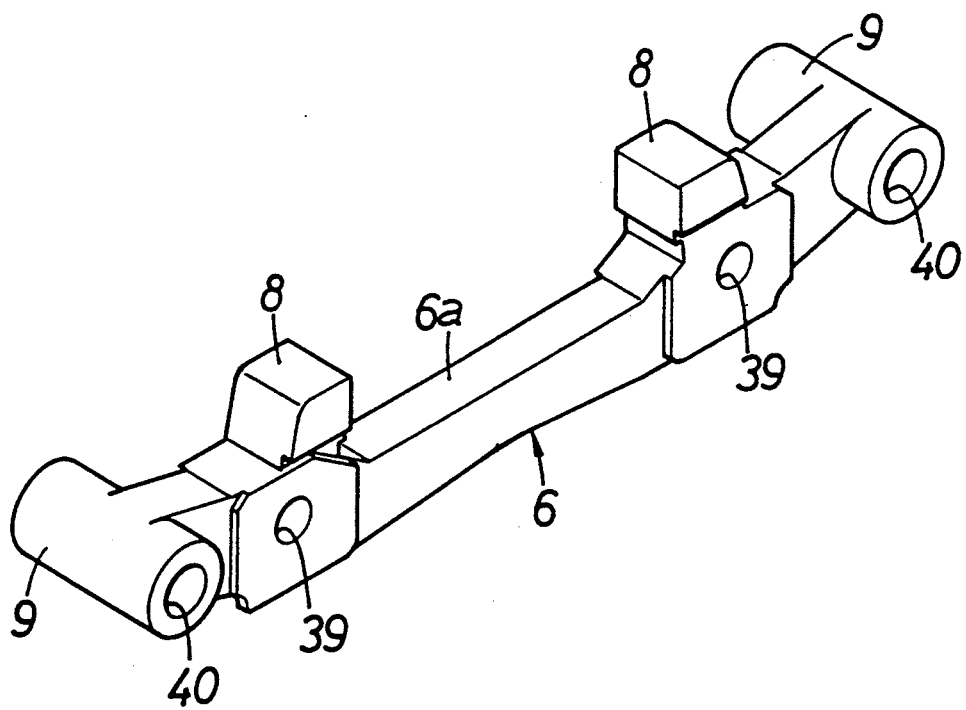
Figure 7:
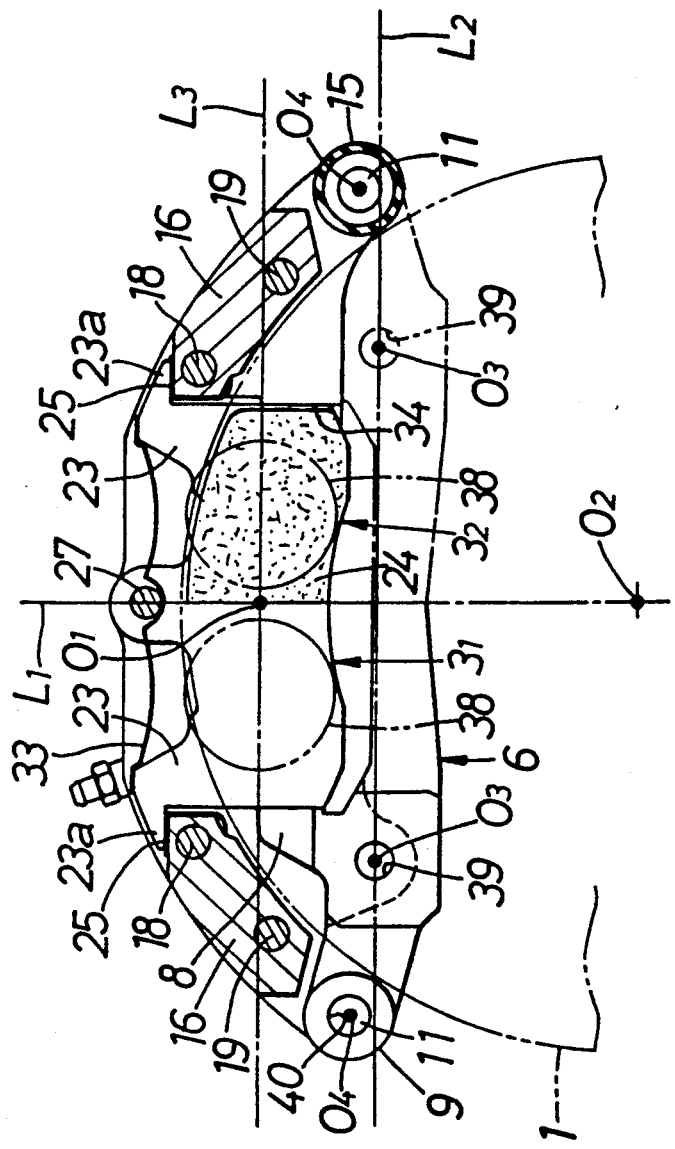

As shown in FIGS. 5 and 7, the body 6a of the bracket 6 is formed in a plate-like shape of a narrow width so as to face one side surface of the brake disk 1. A pair of first braking-torque support portions 8 are raised on opposite ends of the body 6a in an opposed relation to each other, while a pair of cylindrical slide-pin support portions 9 are continuously provided at opposite ends of the body 6a with axes of the support portions 9 being parallel to the axis of rotation c of the brake disk 1. Thus, the first braking-torque support portions 8 and the slide-pin support portions 9 are provided on the body 6a independently of each other.

Figure 1:
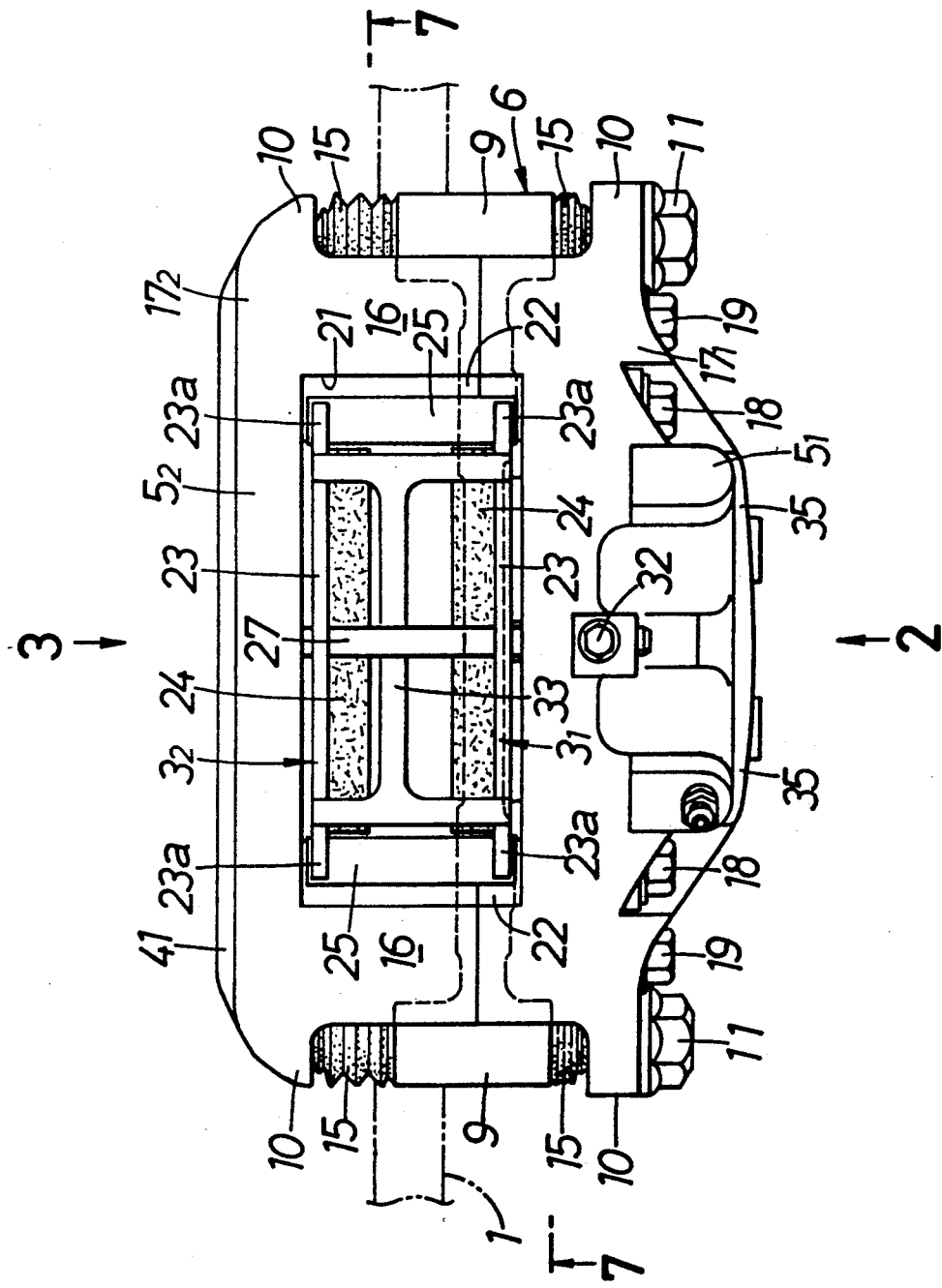
Figure 6:
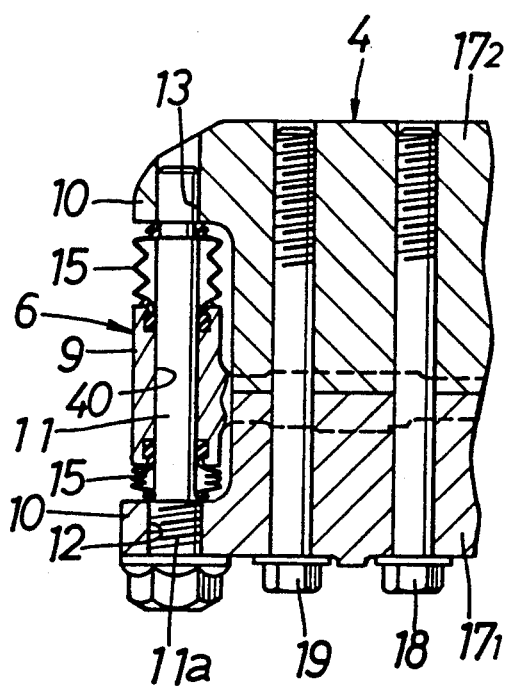

As clearly shown in FIGS. 1 and 6, each of the first and second clamping arms $5_1$, $5_2$ has a pair of lugs 10 at opposite ends of each arm in the circumferential direction of the brake disk 1. Slide pins 11 are provided to extend between the two pairs of opposed lugs 10 of both the arms $5_1$, $5_2$ and are slidably fitted in the slide-pin support portions 9 of the bracket 6, respectively. Each slide pin 11 is provided at a base end thereof with an external thread portion 11a which is threaded in a tapped hole 12 formed in each the lug 10 on the side of the first clamping arm $5_1$, while a tip end of each slide pin 11 is fitted in a pin hole 13 formed in each the lug 10 on the side of the second clamping arm $5_2$.

A portion of each slide pin 11 between the lug 10 and the slide-pin support portion 9 is covered with expansion dust-proof boot 15.

The brake caliper 4 is comprised of a block $17_1$ having the first clamping arm $5_1$, and a block $17_2$ having the second clamping arm $5_2$. A pair of opposing protrusions of both the blocks $17_1$, $17_2$ are connected, thereby to form a pair of bridge portions 16 which connect the end parts of both the clamping arms $5_1$, $5_2$ in the circumferential direction of the brake disk 1. Both the blocks $17_1$, $17_2$ are secured by two pairs of connecting bolts 18, 19 at the bridge portions 16.

A window 21 is defined by the first and second clamping arms $5_1$, $5_2$ and both the bridge portions 16. Both the inner ends of the window 21 in the circumferential direction of the brake disk 1 are formed with steps 22 which extend along the axis of rotation c.

Each of the friction pads $3_1$, $3_2$ comprises a back plate 23, and a lining 24 attached to this back plate. As clearly shown in FIG. 7, hook portions 23a formed at opposite ends of each back plate 23 in the circumferential direction of the brake disk 1 are suspended on the steps 22 through retainers 25 for sliding movements along the axis of rotation c.

Figure 8:
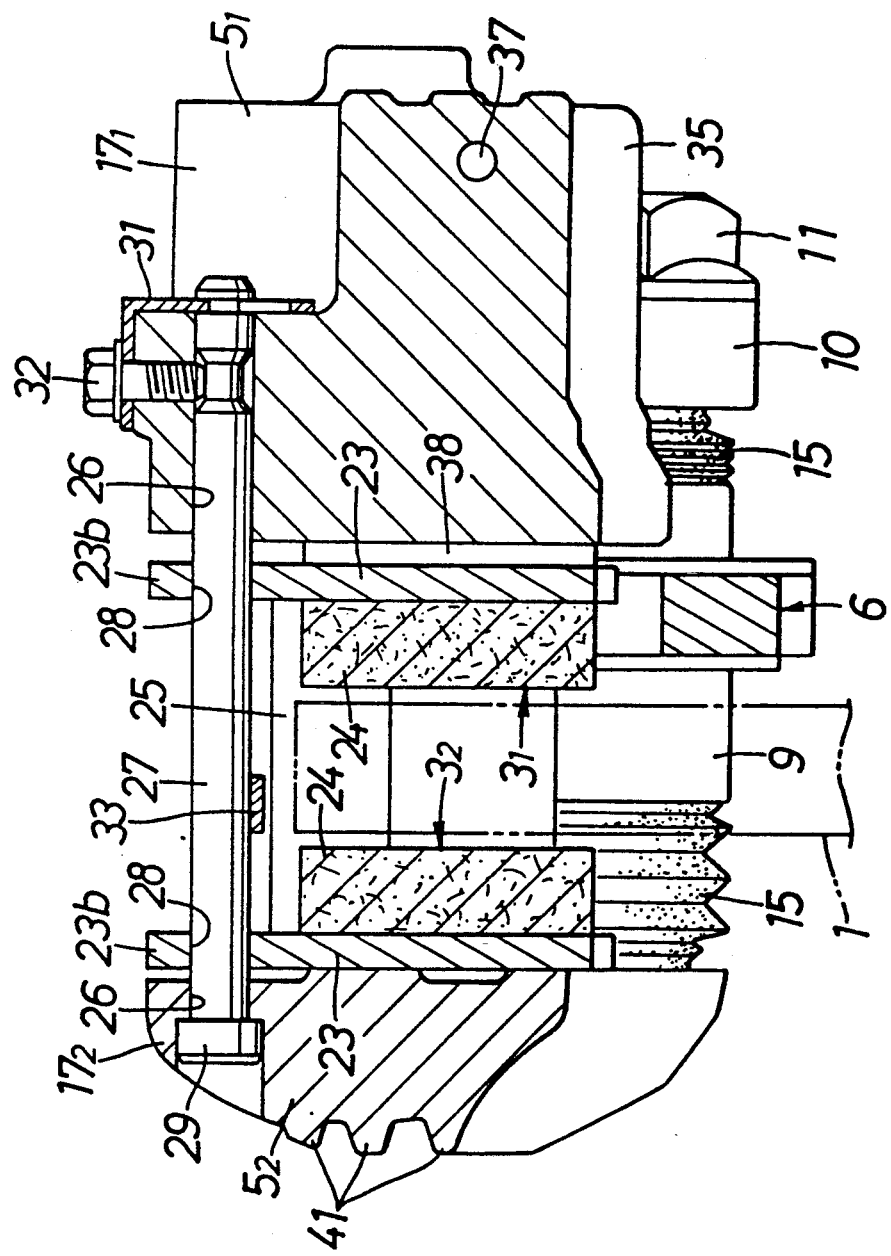

As clearly shown in FIG. 8, at the central part of the window 21 in the circumferential direction of the brake disk 1, a pin hole 26 is formed through the first and second clamping arms $5_1$, $5_2$ so as to extend along the axis of rotation c. A hanger pin 27 is removably inserted into the pin holes 26 between the arms $5_1$ and $5_2$.

The back plates 23 of both the friction pads $3_1$, $3_2$, are provided at their central portions in the circumferential direction of the brake disk 1 with projections 23b. The hanger pin 27 is inserted through both through holes 28 formed in the projections 23b. Thus, both the friction pads $3_1$, $3_2$ are suspended by the hanger pin 27.

The hanger pin 27 is prevented from slipping out from the second clamping arm $5_2$ by engaging a stopper 29 provided on the base end of this hanger pin with an edge of the pin hole 26. On the other hand, the hanger pin 27 is prevented from slipping out from the first clamping arm $5_1$ in such a way that a hook-shaped slip-out preventing plate 31 is engaged with the tip end of the hanger pin at the portion projected from the outer side surface of the first clamping arm $5_1$. The plate 31 is secured to the first clamping arm $5_1$ by a screw 32. The tip end of the screw 32 abuts against the hanger pin 27 so as to urge this hanger pin against the inner peripheral surface of the pin hole 26. Thus, the hanger pin 27 is prevented from loosening or rattling in the axial and radial directions thereof.

As clearly shown in FIGS. 1 and 7, a pad spring 33 is retained to the hanger pin 27, and the opposite ends of the pad spring 33 resiliently urge the hook portions 23a of the first and second friction pads $3_1$, $3_2$ against the steps 22. Thus, both the friction pads $3_1$, $3_2$ are prevented from rattling.

As clearly shown in FIG. 7, the opposite end faces of the back plate 23 of the first friction pad $3_1$ in the circumferential direction of the brake disk 1 abut against the first braking-torque support portions 8, respectively.

Likewise, as shown in FIG. 7, a pair of second braking-torque support portions 34 for supporting the braking torque of the second friction pad $3_2$ are protrusively provided at the base ends of both the constituent parts of the bridge portion 16 in the block $17_2$ on the side of the second clamping arm $5_2$. And the opposite end faces of the back plate 23 of the second friction pad $3_2$ in the circumferential direction of the brake disk 1 abut against both the second braking-torque support portions 34, respectively.

In the above construction, replacement of the friction pads $3_1$, $3_2$ are conducted through the window 21.

Figure 2:
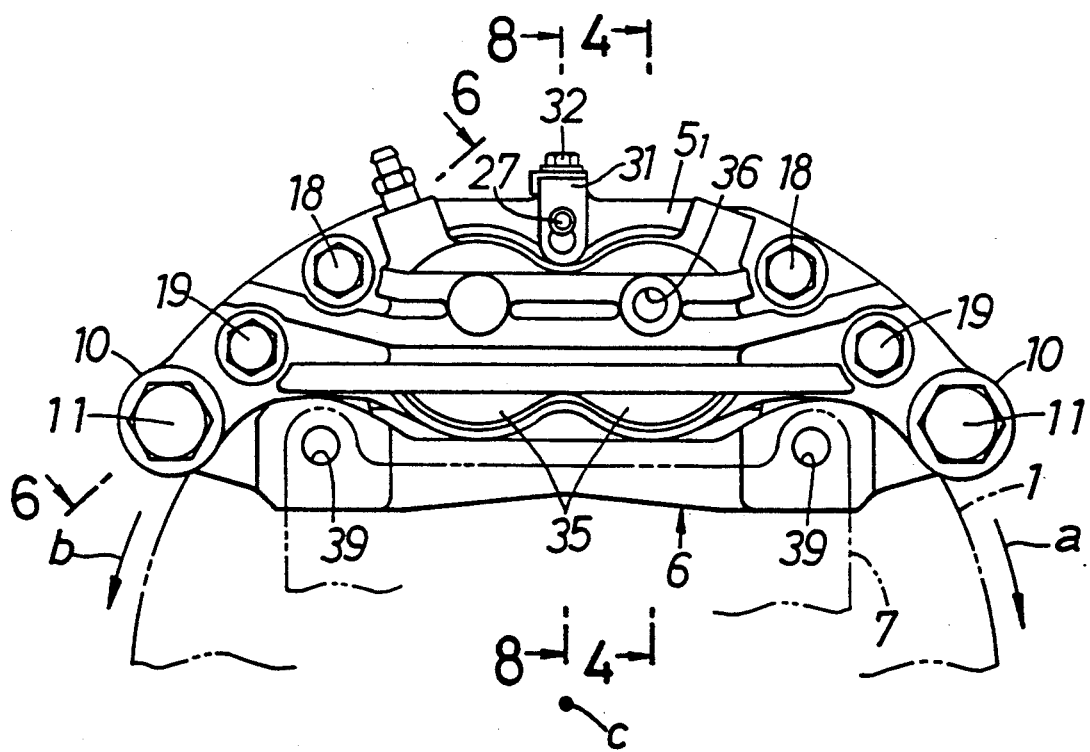
Figure 4:
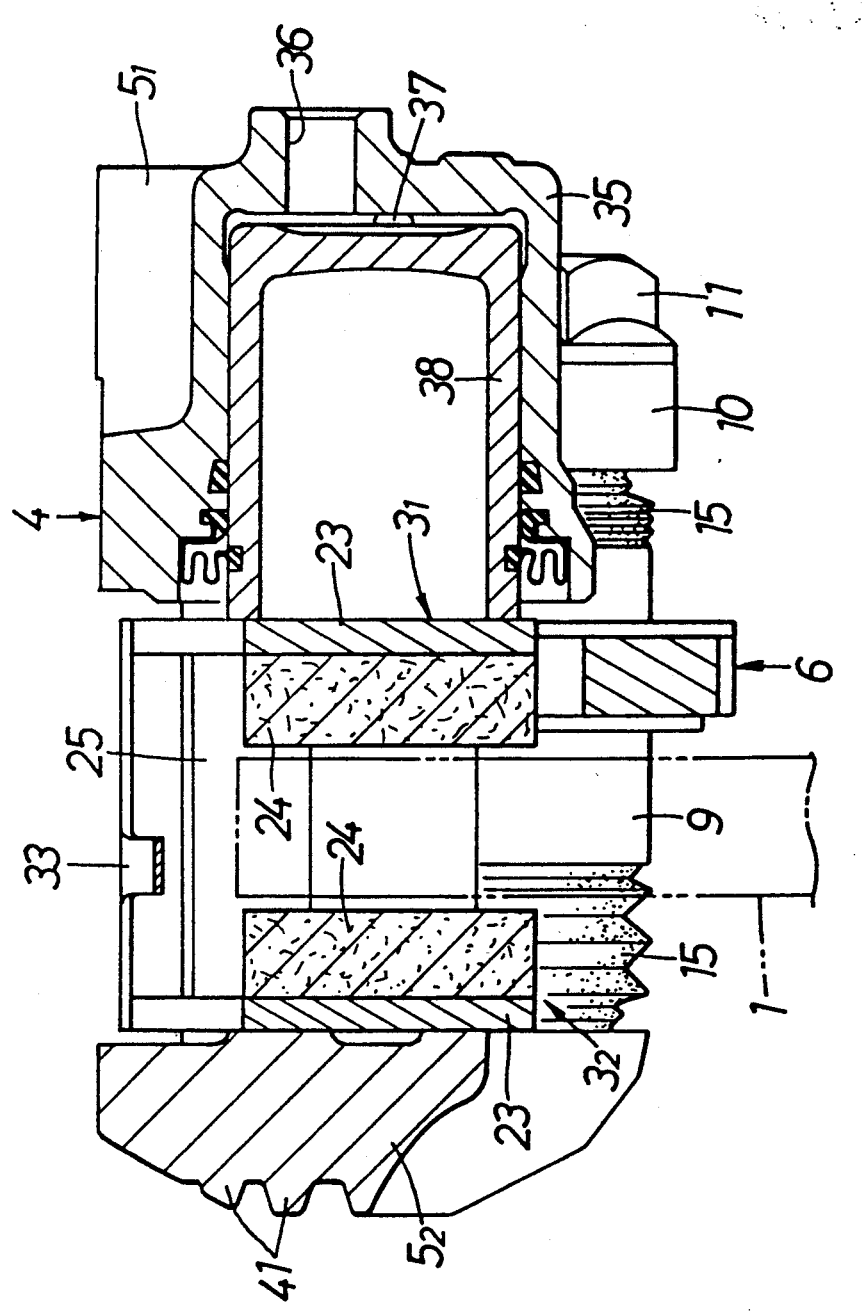

As clearly shown in FIGS. 2 and 4, a pair of cylinders 35 whose openings are directed to the first friction pad $3_1$ are formed along the circumferential direction of the brake disk 1 in the part of the first clamping arm $5_1$ between both the connecting bolts 18. One of the cylinders 35 is communicated with a known master cylinder through a pressure oil introducing port 36, and interiors of both the cylinders 35 are communicated with each other through a communicating hole 37.

A piston 38 as an urging member, which urges the first friction pad $3_1$ against the brake disk 1, is slidably fitted in each cylinder 35.

As shown in FIG. 7, the urging center $O_1$ of both the pistons 38 exists at the central position of the first friction pad $3_1$ in the circumferential direction of the brake disk 1, that is, at the bisectional point of a straight line $L_3$ connecting the axes of both the pistons 38, in the illustrated embodiment.

A pair at which fixing points of the bracket 6 is fixed to the knuckle 7, i.e., a pair of centers $O_3$ of fixing bolt inserting holes 39 in the illustrated embodiment are disposed on one face side of the brake disk 1 on a first straight line $L_1$ which passes the urging center $O_1$ and a center of rotation $O_2$ of the brake disk 1. The centers $O_3$ are set on a second straight line $L_2$ crossing the first straight line $L_1$ (at right angles in the illustrated embodiment) at a position closer to the center $O_2$ with respect to the center $O_1$. In addition, the centers $O_3$ are respectively located on opposite sides of the first straight line $L_1$.

The slide-pin support points of both the slide-pin support portions 9, that is, the centers $O_4$ of pin inserting holes 40 in the illustrated embodiment, are respectively arranged in a region defined between the second straight line $L_2$ and a third straight line $L_3$ which passes through the urging center $O_1$ in parallel with this second straight line $L_2$.

Figure 3:
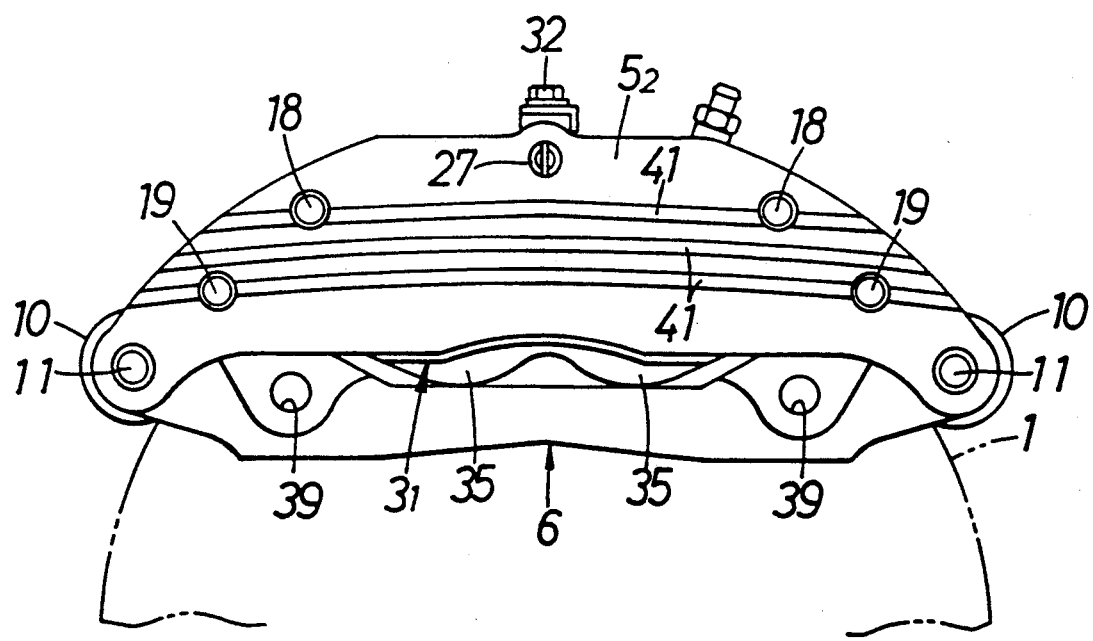

As clearly shown in FIG. 3, three reinforcing ribs 41 which are substantially straight are formed on the outer side surface of the second clamping arm $5_2$ and substantially in parallel with one another so as to extend near to opposite ends of this clamping arm $5_2$ in the circumferential direction of the brake disk 1.

Next, the operation of this embodiment will be described.

During forward travel of the automobile, when a brake pedal or the like is operated pressure oil is supplied from the master cylinder (not shown) into both the cylinders 35 through the pressure oil introducing port 36. Both the pistons 38 advances by the hydraulic pressure to urge the first friction pad $3_1$. Consequently, the friction pad $3_1$ moves while sliding on the step 22 of the brake caliper 4 and the hanger pin 27 and is urged against one face of the brake disk 1. Then, by a reaction attendant upon the urging, the brake caliper 4 slides in the direction opposite to advance of both the pistons 38 through the slide pins 11. The second friction pad $3_2$ is urged against the other face of the brake disk 1 by the second clamping arm $5_2$. Thus, braking is applied to the brake disk 1.

During such braking, the braking torque of the first friction pad $3_1$ is supported by the first braking-torque support portions 8 of the bracket 6, while the braking torque of the second friction pad $3_2$ is supported by the second braking-torque support portions 34 of the brake caliper 4.

In this case, when the first braking-torque support portions 8 supports the braking torque of the first friction pad $3_1$, the portions 8 deflect more or less. However, since the first braking-torque support portions 8 and the slide-pin support portions 9 are independent of each other, such deflections are not transmitted to the slide-pin support portions 9. Thus, the twists between the slide pins 11 and the slide-pin support portions 9 attributed to the braking torque are prevented from occurring.

Besides, if the relationship of arrangement between the slide-pin support points $O_4$ and the fixing points $O_3$ of the bracket 6 is specified as stated above, the distance between the points $O_4$ and $O_3$ is shortened. Therefore, even when the braking torque of the second friction pad $3_2$ has acted on the slide-pin support points $O_4$ through the second braking-torque support portions 34 as well as the slide pins 11, turning moments which is generated about the fixing points $O_3$ are relatively small. Thus, the durability of the bracket 6 can be enhanced.

Figure 9:
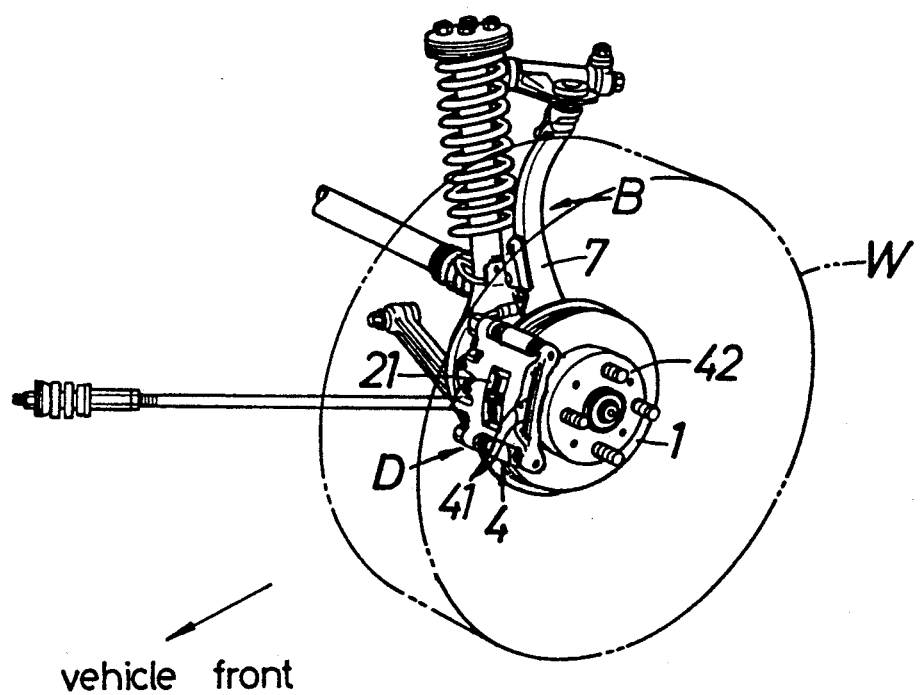

FIG. 9 shows the relationship between the disk brake D and a vehicle body B. The brake caliper 4 is disposed so that the window 21 is directed to a front direction of the vehicle and the second clamping arm $5_2$ is located on the side of a wheel W, and the bracket 6 is fixed to the knuckle 7. The brake disk 1 is secured to a hub 42 for mounting the wheel W.

If the brake caliper 4 is disposed in this manner, airstream is introduced into the brake caliper 4 through the window 21, and the reinforcing ribs 41 function also as cooling fins. Therefore, the friction pads $3_1$, $3_2$ and the brake caliper 4 can be efficiently cooled.

Figure 10:
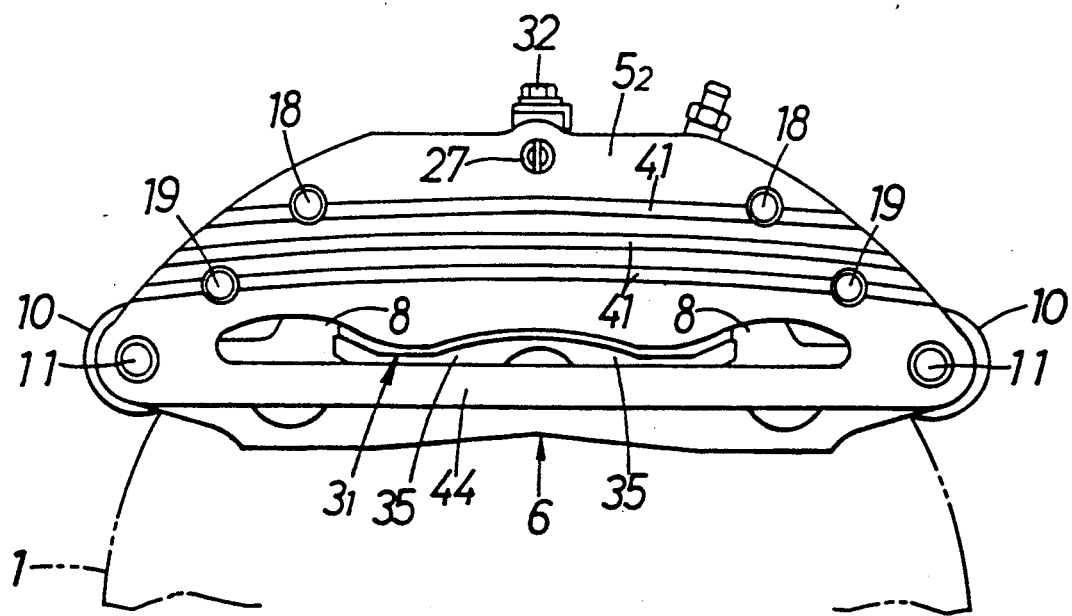
FIG. 10 illustrates a second embodiment and is a view corresponding to FIG. 3.

FIG. 10 illustrates the second embodiment of the present invention. This embodiment has an arrangement similarly to that of the first embodiment except that, in a second arch clamping arm $5_2$ which extends along the arc shape of a brake disk 1, a pair of lugs 10 located at opposite ends of this arm $5_2$ in the circumferential direction of the brake disk 1 are connected by a tie bar 44.

If both the lugs 10 are connected by the tie bar 44 as described above, when a braking torque is supported on the side of the second clamping arm $5_2$, it is possible to restrain the displacement of one of the lugs 10 by the tie bar 44. Thus, the twists between slide pins 11 and slide-pin support portions 9 can be prevented from occurring, thereby contributing to the smooth slide movement of a brake caliper 4.

Figure 11:
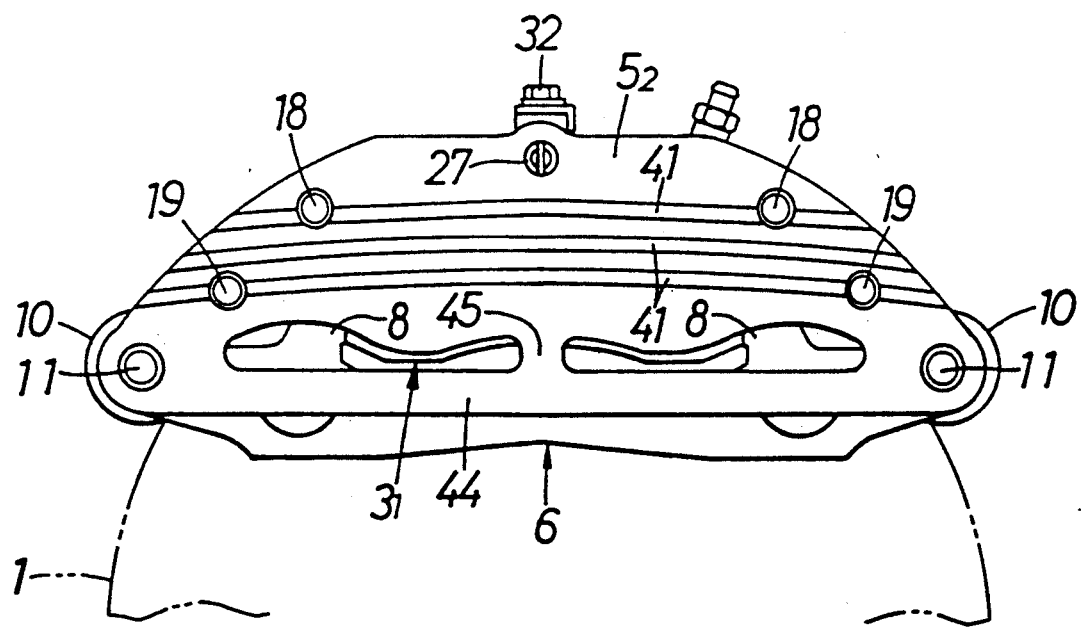
FIG. 11 illustrates a modification of the second embodiment and is a view corresponding to FIG. 3.

In addition, FIG. 11 illustrates a modification of the second embodiment. A connection portion 45 for connecting a tie bar 44 with a second clamping arm $5_2$ is provided at the intermediate portion of the tie bar 44, thereby enhancing the strength of the tie bar 44.

What is claimed is:

1. A reaction force type disk brake comprising a first and a second friction pad facing opposite faces of a brake disk, respectively; a brake caliper provided with a first and a second clamping arm for clamping both the friction pads; opposite ends of the brake caliper in a circumferential direction of the brake disk being supported by a pair of slide-pin support portions of a fixed bracket through slide pins outside an outer periphery of the brake disk for sliding movements in a direction of a rotational axis of the brake disk; an urging member provided on the first clamping arm and having a center of urging at a central position of the first friction pad in the circumferential direction of the brake disk for urging the first friction pad to the brake disk; a pair of first braking-torque support portions mounted on the bracket for supporting a braking torque of the first friction pad; and a pair of second braking-torque support portions mounted on the brake caliper for supporting a brake torque of the second friction pad; wherein a pair of fixing points at which the bracket is fixed to a stationary member are located on the opposite sides of a first straight line which passes the center of urging and a center of rotation of the brake disk, the fixing points being disposed on a second straight line which crosses the first straight line at a location closer to the center of rotation with respect to the center of urging, and wherein a slide-pin support portions and the first braking-torque support portions are formed in a body of the bracket in a bifurcated manner from the fixing points, and slide-pin support points of both the slide-pin support portions are arranged in a region defined between the second straight line and a third straight line which passes through the center of urging in parallel with the second straight line.

2. A reaction force type disk brake according to claim 1, wherein a pair of lugs provided at opposite end portions of said second clamping arm in the circumferential direction of said brake disk for supporting said slide pins are connected integrally by a tie bar.

3. A reaction force type disk brake according to claim 1, wherein the first braking torque support portions are located in a region defined between the second and third straight lines.

* * * * *